(12) United States Patent
Fukuda et al.

(10) Patent No.: US 10,877,411 B2
(45) Date of Patent: Dec. 29, 2020

(54) FIXING BELT MEMBER, FIXING DEVICE, AND IMAGE FORMING APPARATUS

(71) Applicant: FUJI XEROX CO., LTD., Tokyo (JP)

(72) Inventors: Shigeru Fukuda, Kanagawa (JP); Hiroaki Tanaka, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/263,452

(22) Filed: Jan. 31, 2019

(65) Prior Publication Data

US 2019/0278207 A1    Sep. 12, 2019

(30) Foreign Application Priority Data

Mar. 7, 2018  (JP) ................................ 2018-041258

(51) Int. Cl.
*G03G 15/20* (2006.01)
(52) U.S. Cl.
CPC .................................. *G03G 15/2057* (2013.01)
(58) Field of Classification Search
CPC .............. G03G 15/2057; C08G 73/105; C08G 73/1071; B32B 27/08; B32B 27/281; C08L 79/08
See application file for complete search history.

(56) References Cited

U.S. PATENT DOCUMENTS

| | | | |
|---|---|---|---|
| 9,335,689 B2 | 5/2016 | Nakajima et al. | |
| 2014/0023413 A1* | 1/2014 | Shinji | G03G 15/2057 399/329 |

FOREIGN PATENT DOCUMENTS

| | | | |
|---|---|---|---|
| JP | 2006-259248 A | | 9/2006 |
| JP | 2007298814 A | * | 11/2007 |
| JP | 2008-158053 A | | 7/2008 |
| JP | 2010217218 A | * | 9/2010 |
| JP | 2012-133220 A | | 7/2012 |
| JP | 2013037213 A | * | 2/2013 |
| JP | 2013-114068 A | | 6/2013 |
| JP | 2016051128 A | * | 4/2016 |

* cited by examiner

*Primary Examiner* — Susan S Lee

(74) *Attorney, Agent, or Firm* — Sughrue Mion, PLLC

(57) ABSTRACT

A fixing belt member includes a base layer. The base layer contains a polyimide-based resin composition and at least one type of particles selected from the group consisting of acetylene black particles and graphitized carbon black particles.

19 Claims, 5 Drawing Sheets

FIXING BELT MEMBER, FIXING DEVICE, AND IMAGE FORMING APPARATUS

CROSS-REFERENCE TO RELATED APPLICATIONS

This application is based on and claims priority under 35 USC 119 from Japanese Patent Application No. 2018-041258 filed Mar. 7, 2018.

BACKGROUND (i) Technical Field

The present disclosure relates to a fixing belt member, a fixing device, and an image forming apparatus.

(ii) Related Art

In image forming apparatuses such as electrophotographic copiers and electrophotographic printers, unfixed toner images formed on a recording medium such as a recording paper sheet are fixed by a fixing device. Known examples of the fixing device include a belt nip type-fixing device including a heating roller and a pressurizing belt disposed in contact with the heating roller and a belt nip-type fixing device including a heating belt and a pressurizing roller disposed in contact with the heating belt.

For example, Japanese Unexamined Patent Application Publication No. 2008-158053 discloses a fixing belt including a polyimide layer, a release layer on its outer circumferential side, and a viscoelastic layer on the inner circumferential side.

Japanese Unexamined Patent Application Publication No. 2006-259248 discloses a transfer fixing belt including a base layer made of a polyimide resin-based composition containing the following components A, B, and C: (A) a heat conductive inorganic filler powder; (B) a conductive powder; and (C) a fluorocarbon resin powder. The average particle diameter of each of the powders of the components A, B, and C is 4.0 μm or less, the average particle diameter being based on their primary particles. The content of the component A is 10 to 50% by weight based on the weight of the solid polyimide resin in the polyimide resin-based composition, and the content of the component B is 5 to 30% by weight based on the weight of the solid polyimide resin in the polyimide resin-based composition. The content of the component C is 0.5 to 10% by weight based on the weight of the solid polyimide resin in the polyimide resin-based composition.

Japanese Unexamined Patent Application Publication No. 2012-133220 discloses a semiconductive film containing a thermoplastic resin and acetylene black in an amount of from 19% by mass to 30% by mass inclusive based on the mass of the thermoplastic resin. The semiconductive film has a volume resistivity of from $1\times10^9$ Ω·cm to $1\times10^{12}$ Ω·cm inclusive. The number of particles of the acetylene black observed in a cross section of the semiconductive film is 20/μm² or more, and the average distance between acetylene black particles is 120 nm or less.

Japanese Unexamined Patent Application Publication No. 2013-114068 discloses a polyimide tube including: a base resin containing a polyimide resin A including, as a main constitutional unit, a repeating unit represented by formula (A) below and further containing a polyimide resin B including, as a main constitutional unit, a repeating unit represented by formula (B) below and/or a polyimide resin C including, as a main constitutional unit, a repeating unit represented by formula (C) below, the mass ratio (the polyimide resin A):(the polyimide resin B+the polyimide resin C) being 30:70 to 70:30; graphite in an amount of 20 to 50% by volume based on the volume of the base resin; high-conductivity carbon black particles in an amount of 3% by volume or more based on the volume of the base resin; and carbon nanotubes in an amount of 0.5% by volume or more based on the volume of the base resin.

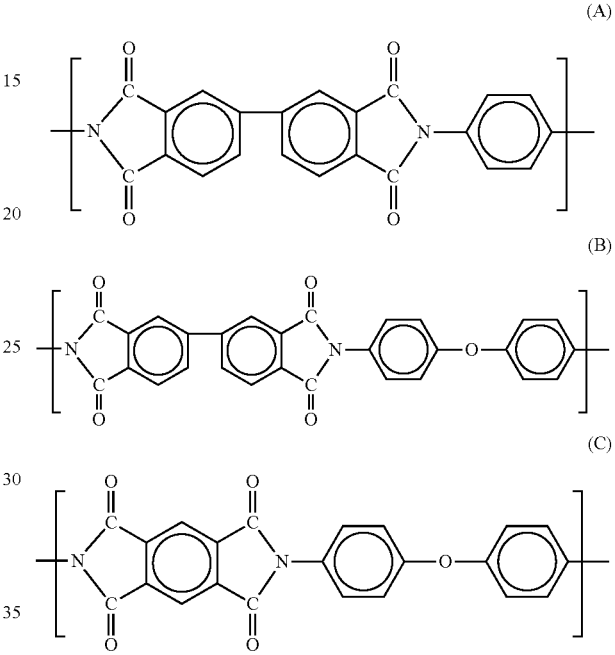

SUMMARY

Aspects of non-limiting embodiments of the present disclosure relate to a fixing belt member having a higher thermal conductivity and having an inner surface where frictional resistance is smaller than that of a fixing belt member containing in its base layer graphite or carbon black other than acetylene black and graphitized carbon black.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a fixing belt member including a base layer containing a polyimide-based resin composition and at least one type of particles selected from the group consisting of acetylene black particles and graphitized carbon black particles.

BRIEF DESCRIPTION OF THE DRAWINGS

Exemplary embodiments of the present disclosure will be described in detail based on the following figures, wherein.

DETAILED DESCRIPTION

Figure 1:
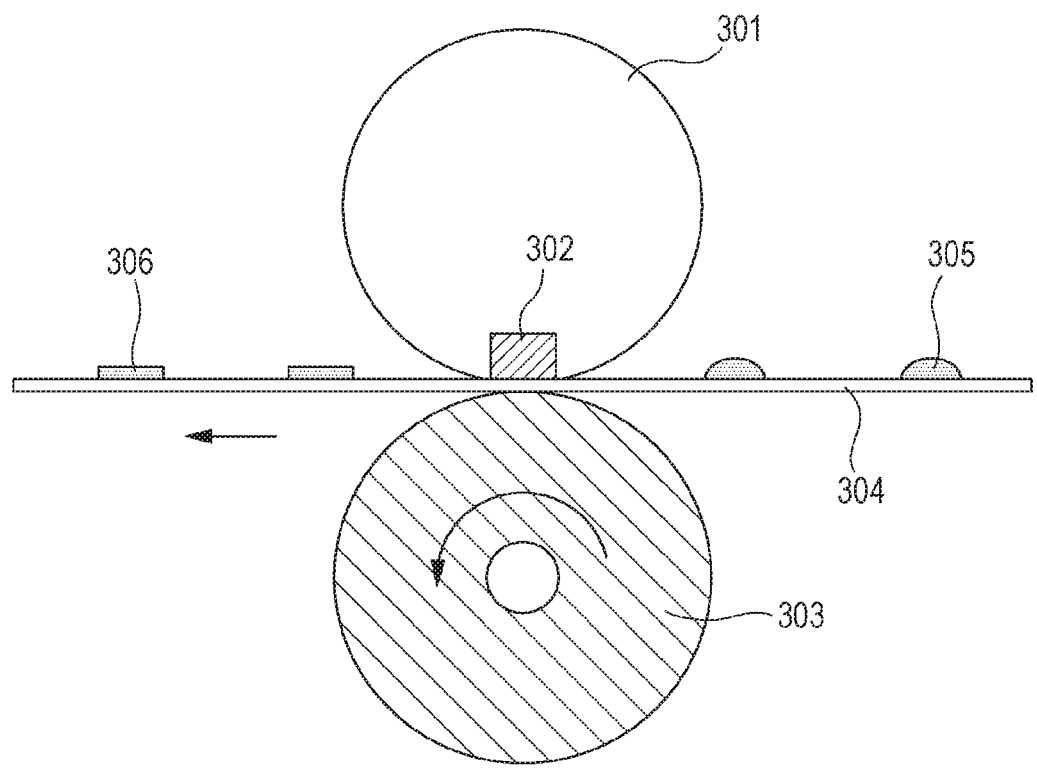
FIG. 1 is an illustration showing a fixing method used to measure a fixation ratio and durability.

Exemplary embodiments of the present disclosure will be described.

<Fixing Belt Member>

A first exemplary mode of a fixing belt member according to one embodiment of the present disclosure includes a base layer containing a polyimide-based resin composition and at least one type of particles selected from the group consisting of acetylene black particles and graphitized carbon black particles.

A second exemplary mode of the fixing belt member according to the embodiment of the present disclosure includes a base layer containing a polyimide-based resin composition. The base layer has a thermal conductivity of 0.33 W/(m·K) or more and has an inner-side surface with a frictional force of 220 gf or less.

In the following description, the phrase "the fixing belt member according to the present exemplary embodiment" is meant to encompass both the first exemplary mode and the second exemplary mode.

The fixing belt member according to the present exemplary embodiment may be an endless belt.

The fixing belt member according to the present exemplary embodiment has any of the above structures. In this case, its thermal conductivity is high, and the frictional resistance of the inner surface of the fixing belt member is low.

The reasons for this may be as follows.

In an image forming apparatus that uses an electrostatic copying method, electric charges are generated on an image holding member formed from a photoconductive photoreceptor, and an electrostatic latent image is formed using, for example, laser light modulated by an image signal. Then the electrostatic latent image is developed with charged toner to visualize the latent image, and the resulting toner image is transferred to a transfer target and fixed by heat fusion to thereby obtain a reproduced image.

In one widely used heat fusion fixing method, a transfer target with an unfixed toner image placed thereon is caused to pass between a fixing roller or belt for heating and a pressurizing roller or belt.

In one example of the fixing process, the unfixed toner image on the transfer target is heated by heating means (such as a heater) through the fixing belt from the inner side and pressurized by the pressurizing roller to fix the unfixed toner image by heat fusion, and a reproduced image is thereby obtained.

The fixing roller or belt is required to have good thermal conduction properties in order to achieve a reduction in heating time, a reduction in power consumption, an increase in fixing speed, etc.

In addition to the thermal conduction properties, the inner surface of the fixing belt is required to have slidability.

For example, in the conventional fixing belt member described in Japanese Unexamined Patent Application Publication No. 2008-158053, it is difficult to obtain sufficient thermal conductivity, and a metal or a ceramic is used to improve the thermal conduction properties.

The fixing belt described in Japanese Unexamined Patent Application Publication No. 2013-114068 contains graphite. Although the thermal conduction properties of this fixing belt are good, the frictional resistance of its inner surface is high.

In the first exemplary mode of the fixing belt member according to the present exemplary embodiment, the base layer contains at least one type of particles selected from the group consisting of acetylene black particles and graphitized carbon black particles. Acetylene black and graphitized carbon black have a graphite structure and an amorphous carbon structure at an appropriate ratio, and this improves the thermal conduction properties. Although details are unclear, when both the graphite structure and the amorphous carbon structure are present on the inner surface of the belt member, the slidability of the inner surface is improved, and the frictional resistance is reduced.

In the second exemplary mode of the fixing belt member according to the present exemplary embodiment, the thermal conductivity of the base layer is 0.33 W/(m·K) or more, and the frictional force of the inner-side surface of the base layer is 220 gf or less. In this case, good thermal conduction properties and good inner surface slidability are obtained.

(Base Layer)

In the first exemplary mode of the fixing belt member according to the present exemplary embodiment, the base layer contains a polyimide-based resin composition and at least one type of particles selected from the group consisting of acetylene black particles and graphitized carbon black particles.

In the second exemplary mode of the fixing belt member according to the present exemplary embodiment, the thermal conductivity of the base layer is 0.33 W/(m·K) or more, and the frictional force of the inner-side surface of the base layer is 220 gf or less.

Means for satisfying the requirements for the thermal conductivity of the base layer and the frictional force of the inner-side surface of the base layer in the second exemplary mode may be, for example, to use the base layer further containing at least one type of particles selected from the group consisting of acetylene black particles and graphitized carbon black particles.

In the following description, when the term "base layer" is used singly, the term is meant to encompass both the base layer in the first exemplary mode and the base layer in the second exemplary mode.

The thermal conductivity of the base layer in the first exemplary mode is preferably 0.33 W/(m·K) or more from the viewpoint of thermal conduction properties.

From the viewpoint of thermal conduction properties, the thermal conductivity of the base layer is more preferably 0.40 W/(m·K) or more, still more preferably 0.43 W/(m·K) or more, and particularly preferably 0.50 W/(m·K) or more.

No particular limitation is imposed on the upper limit of the thermal conductivity of the base layer, but the thermal conductivity is preferably 2.00 W/(m·K) or less.

To measure the thermal conductivity of the base layer in the present exemplary embodiment, the ai-Phase Mobile (manufactured by ai-Phase Co., Ltd.) is used. A sample of the fixing belt member is placed on a probe, and a weight of 50 gf is placed thereon. The thermal conductivity is measured three times in a manual mode at 1.41 V for a measurement time of 2 seconds in 10 divisions in the range of 3 Hz to 100 Hz, and the average of the measurements is used as the thermal conductivity.

The frictional force of the inner-side surface of the base layer in the first exemplary mode is preferably 220 gf (gram-force) or less from the viewpoint of inner surface slidability.

From the viewpoint of inner surface slidability, the frictional force of the inner-side surface of the base layer is more preferably 200 gf or less, still more preferably 180 gf or less, and particularly preferably 160 gf or less.

To measure the frictional force of the inner-side surface of the base layer, the surface property tester type 14 (manufactured by Shinto Scientific Co., Ltd.) is used. A urethane rubber probe with a hardness of 60°, a thickness of 3 mm, and a width of 20 mm is placed on the inner surface of a sample of the fixing belt member such that the angle between the urethane rubber probe and the surface of the fixing belt member is 10°. With a vertical load of 200 g applied to the urethane rubber probe, the urethane rubber probe is pulled and moved a distance of 50 mm at a speed of 10 mm/s, and the average load during the movement is measured. The load is measured three times, and the average of the measurements is used as the frictional force.

In the fixing belt member according to the present exemplary embodiment, a fold number in the following bending test is preferably 2,500 or more, more preferably 5,000 or more, and particularly preferably 10,000 or more, from the viewpoint of durability.

In the bending test, a sample of 15 mm in width×150 mm in length cut from the fixing belt member in its circumferential direction is used, and a folding endurance tester shown in JIS-P8115 is used. The radius of curvature of a bending portion and tension are changed to change the bending stress applied to the sample. An S-N graph with the horizontal axis representing the fold number and the vertical axis representing the stress is produced, and the fold number when the bending stress is 100 MPa is determined. The bending angle is 135° on one side, and the bending speed is 175 cycles/min.

—At Least One Type of Particles Selected from the Group Consisting of Acetylene Black Particles and Graphitized Carbon Black Particles—

In the first exemplary mode of the fixing belt member according to the present exemplary embodiment, the base layer contains at least one type of particles selected from the group consisting of acetylene black particles and graphitized carbon black particles.

In the second exemplary mode of the fixing belt member according to the present exemplary embodiment, the base layer may contain at least one type of particles selected from the group consisting of acetylene black particles and graphitized carbon black particles from the viewpoint of durability, thermal conduction properties, and inner surface slidability.

Acetylene black is carbon black obtained using acetylene as a raw material and has both a graphite structure and an amorphous carbon structure.

Graphitized carbon black is obtained by subjecting carbon black to graphitization treatment to partially graphitize the carbon black.

In the fixing belt member according to the present exemplary embodiment, acetylene black may be used from the viewpoint of purity and quality stability, and graphitized carbon black may be used from the viewpoint of ease of controlling the amount of the graphite structure.

The graphitization degree (G/D ratio) of the particles described above is preferably 1 or more and more preferably 2 or more, from the viewpoint of thermal conduction properties and inner surface slidability.

The graphitization degree in the present exemplary embodiment is computed by measuring peaks of the graphite structure etc. by an X-ray diffraction method or Raman spectroscopy.

Specifically, for example, a Raman microspectrophotometer is used to measure a Raman spectrum in the range of 50 $cm^{-1}$ to 8,000 $cm^{-1}$, and the graphitization degree is determined as the ratio of the peak of a G band originating from a carbon six-membered ring structure (around 1,600 $cm^{-1}$) to the peak of a D band originating from the diamond structure (around 1,350 $cm^{-1}$).

From the viewpoint of dispersibility, thermal conduction properties, and inner surface slidability, the average primary particle diameter of the particles is preferably from 5 nm to 200 nm inclusive, more preferably from 10 nm to 150 nm inclusive, still more preferably from 25 nm to 100 nm inclusive, and particularly preferably from 35 nm to 80 nm inclusive.

The average primary particle diameter of the particles is measured by the following method.

First, a measurement sample with a thickness of 100 nm is cut from the fixing belt member used for the measurement using a microtome and observed under a TEM (transmission electron microscope). The diameters of circles having areas equal to the projected areas of 50 particles are used as particle diameters, and the average of the particle diameters is used as the average primary particle diameter.

The base layer may contain only one type of particles or two or more types of particles.

The ratio of the mass of the particles contained in the base layer to the mass of the polyimide-based resin composition contained in the base layer (the particles:the polyimide resin) is preferably 2:1 to 1:10, more preferably 1.5:1 to 1:8, still more preferably 1:1 to 1:5, particularly preferably 1:1 to 1:3, from the viewpoint of durability, thermal conduction properties, and inner surface slidability.

—Polyimide-Based Resin Composition—

In the fixing belt member according to the present exemplary embodiment, the base layer contains a polyimide-based resin composition.

The polyimide-based resin composition may be any resin composition containing a polyimide resin. The polyimide-based resin composition contains the polyimide resin in an amount of preferably 50% by mass or more, more preferably 80% mass or more, and particularly preferably 90% mass or more.

Examples of the polyimide resin include imidized products of polyamide acids (polyamic acids) that are polymerized products of tetracarboxylic dianhydride and diamine compounds. A specific example of the polyimide resin is a product obtained by subjecting equimolar amounts of tetracarboxylic dianhydride and a diamine compound to a polymerization reaction in a solvent to obtain a polyamide acid solution and subjecting the polyamide acid solution to imidization.

One example of the polyimide resin is a resin having a constituent unit represented by the following general formula (I).

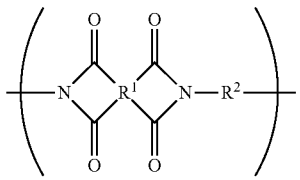

General formula (I)

In general formula (I), $R^1$ is a tetravalent organic group and is an aromatic group, an aliphatic group, an alicyclic group, a combination of an aromatic group and an aliphatic group, or any of the above groups substituted by a substituent (e.g., a residue of tetracarboxylic dianhydride described later). $R^2$ is a divalent organic group and is an aromatic group, an aliphatic group, an alicyclic group, a combination of an aromatic group and an aliphatic group, or any of the above groups substituted by a substituent (e.g., a residue of a diamine compound described later).

Specific examples of the tetracarboxylic dianhydride include pyromellitic dianhydride, 3,3',4,4'-benzophenonetetracarboxylic acid dianhydride, 3,3',4,4'-biphenyltetracarboxylic acid dianhydride, 2,3,3',4-biphenyltetracarboxylic acid dianhydride, 2,3,6,7-naphthalenetetracarboxylic acid dianhydride, 1,2,5,6-naphthalenetetracarboxylic acid dianhydride, 1,4,5,8-naphthalenetetracarboxylic acid dianhydride, 2,2'-bis(3,4-dicarboxyphenyl)sulfonic dianhydride, perylene-3,4,9,10-tetracarboxylic dianhydride, bis(3,4-dicarboxyphenyl)ether dianhydride, and ethylene tetracarboxylic dianhydride.

Specific examples of the diamine compound include 4,4'-diaminodiphenyl ether, 4,4'-diaminodiphenylmethane, 3,3'-diaminodiphenylmethane, 3,3'-dichlorobenzidine, 4,4'-diaminodiphenyl sulfide, 3,3'-diaminodiphenyl sulfone, 1,5-diaminonaphthalene, m-phenylenediamine, p-phenylenediamine, 3,3'-dimethyl-4,4'-biphenyldiamine, benzidine, 3,3'-dimethylbenzidine, 3,3'-dimethoxybenzidine, 4,4'-diaminodiphenyl sulfone, 4,4'-diaminodiphenylpropane, 2,4-bis(β-amino-tert-butyl)toluene, bis(p-β-amino-tert-butylphenyl)ether, bis(p-β-methyl-δ-aminophenyl)benzene, bis-p-(1,1-dimethyl-5-amino-pentyl)benzene, 1-isopropyl-2,4-m-phenylenediamine, m-xylylenediamine, p-xylylenediamine, di(p-aminocyclohexyl)methane, hexamethylenediamine, heptamethylenediamine, octamethylenediamine, nonamethylenediamine, decamethylenediamine, diaminopropyltetramethylene, 3-methylheptamethylenediamine, 4,4-dimethylheptamethylenediamine, 2,11-diaminododecane, 1,2-bis-3-aminopropoxyethane, 2,2-dimethylpropylenediamine, 3-methoxyhexamethylenediamine, 2,5-dimethylheptamethylenediamine, 3-methylheptamethylenediamine, 5-methylnonamethylenediamine, 2,17-diaminoeicosadecane, 1,4-diaminocyclohexane, 1,10-diamino-1,10-dimethyldecane, 12-diaminooctadecane, 2,2-bis[4-(4-aminophenoxy)phenyl]propane, piperazine, $H_2N(CH_2)_3O(CH_2)_2O(CH_2)NH_2$, $H_2N(CH_2)_3S(CH_2)_3NH_2$, and $H_2N(CH_2)_3N(CH_3)_2 (CH_2)_3NH_2$.

The solvent used when the tetracarboxylic dianhydride is reacted with the diamine may be a polar solvent (organic polar solvent) from the viewpoint of solubility etc. The polar solvent may be, for example, N,N-dialkylamides. Specific examples of the polar solvent include low-molecular weight polar solvents such as N,N-dimethylformamide, N,N-dimethylacetamide, N,N-diethylformamide, N,N-diethylacetamide, N,N-dimethylmethoxyacetamide, dimethyl sulfoxide, hexamethylphosphortriamide, N-methyl-2-pyrrolidone, pyridine, tetramethylene sulfone, and dimethyltetramethylene sulfone. These may be used alone or in combination of two or more.

In particular, the polyimide resin may be a polyimide resin (BPDA-ODA) formed from 3,3',4,4'-biphenyltetracarboxylic acid dianhydride and 4,4'-diaminodiphenyl ether or a polyimide resin (BPDA-PDA) formed from 3,3',4,4'-biphenyltetracarboxylic acid dianhydride and p-phenylenediamine from the viewpoint of durability, thermal conduction properties, and inner surface slidability.

—Additional Additives—

The base layer may contain additional additives.

The additional additives contained in the base layer may be known additives, and examples of the additives used include: dispersants that improve the dispersibility of the particles; various fillers that impart various functions such as mechanical strength; catalysts that facilitate an imidization reaction; leveling agents that improve the quality of film products; parting materials that improve releasability (e.g., fluorocarbon resin particles such as polytetrafluoroethylene (PTFE) particles, tetrafluoroethylene-perfluoroalkyl vinyl ether copolymer (PFA) particles, and tetrafluoroethylene-hexafluoropropylene copolymer (FEP) particles); and thermoplastic resins other than the above-described polyimide resins.

The thickness of the base layer is preferably from 30 μm to 200 μm inclusive, more preferably from 50 μm to 150 μm inclusive, and particularly preferably from 70 μm to 120 μm inclusive, from the viewpoint of durability and thermal conduction properties.

The fixing belt member according to the present exemplary embodiment may optionally include known additional layers such as a surface layer.

Examples of the additional layers include an elastic layer, a surface layer, and a bonding layer.

However, since the frictional resistance of the inner surface of the base layer in the fixing belt member according to the present exemplary embodiment is small, the base layer may be exposed at the inner surface of the fixing belt member.

(Elastic Layer)

The fixing belt member according to the present exemplary embodiment may include an elastic layer disposed on the base layer.

No particular limitation is imposed on the heat-resistant elastic material, and a rubber material is used preferably. More preferably, the elastic layer contains, for example, silicone rubber.

Examples of the silicone rubber include RTV silicone rubber, HTV silicone rubber, and liquid silicone rubber. Specific examples of the silicone rubber include polydimethyl silicone rubber (MQ), methylvinyl silicone rubber (VMQ), methylphenyl silicone rubber (PMQ), and fluorosilicone rubber (FVMQ).

The elastic layer may contain various additives. Examples of the additives include softening agents (such as paraffin-based softening agents), processing aids (such as stearic acid), antioxidants (such as amine-based antioxidants), vulcanizing agents (such as sulfur, metal oxides, and peroxides), and functional fillers (such as alumina).

The thickness of the elastic layer is preferably from 30 μm to 600 μm inclusive and more preferably from 100 μm to 500 μm inclusive.

For example, hardness measured using the ASKER rubber hardness tester type C (manufactured by Kobunshi Keiki Co., Ltd.) may be used as the hardness of the elastic layer (the hardness may be hereinafter referred to as ASK-C), and the hardness may be 30° or more, 40° or more, and 50° or more. For example, when the fixing belt member is used as the fixing belt of an image forming apparatus, no particular limitation is imposed on the upper limit of the hardness, so long as the fixing belt member can conform to protruding portions a toner image on a recording medium so that the surface of a fixing member is not prevented from adhering to the toner image. The upper limit of the ASK-C is, for example, 90° or less.

(Surface Layer)

The fixing belt member according to the present exemplary embodiment may include a surface layer on the elastic layer.

For example, the surface layer may contain a heat-resistant parting material (surface layer-forming material).

Examples of the heat-resistant parting material include fluorocarbon rubber, fluorocarbon resins, silicone resins, and polyimide resins.

Of these, fluorocarbon resins may be used as the heat-resistant parting material. The surface layer containing a fluorocarbon resin and formed as a thin film is easily wrinkled. However, in the present exemplary embodiment, the surface layer is prevented from being wrinkled.

Specific examples of the fluorocarbon resin include tetrafluoroethylene/perfluoroalkyl vinyl ether copolymers (PFA), polytetrafluoroethylene (PTFE), tetrafluoroethylene/hexafluoropropylene copolymers (FEP), polyethylene/tetrafluoroethylene copolymers (ETFE), polyvinylidene fluoride (PVDF), polychlorotrifluoroethylene (PCTFE), and vinyl fluoride (PVF).

The thickness of the surface layer is preferably 100 μm or less, more preferably from 5 μm to 50 μm inclusive, and particularly preferably from 10 μm to 40 μm inclusive.

(Bonding Layer)

From the viewpoint of improving the adhesion between the elastic layer and the surface layer, a bonding layer may be formed therebetween.

A known adhesive may be used for the bonding layer, and the bonding layer may be formed using, for example, a silane coupling agent having an epoxy group as the adhesive. Specifically, the bonding layer may be a layer formed of a cured product of a composition containing a silane coupling agent having an epoxy group.

Specific examples of the silane coupling agent having an epoxy group include 2-(3,4-epoxycyclohexyl) ethyltrimethoxysilane, 3-glycidoxypropylmethyldimethoxysilane, 3-glycidoxypropyltrimethoxysilane, 3-glycidoxypropylmethyldiethoxysilane, and 3-glycidoxypropyltriethoxysilane. Examples of a commercial product of the silane coupling agent having an epoxy group include KBM-303, KBM-402, KBM-403, KBE-402, and KBE-403 (manufactured by Shin-Etsu Chemical Co., Ltd.).

To form the bonding layer, an additional silane coupling agent may be used in addition to the silane coupling agent having an epoxy group. Examples of the additional silane coupling agent include amino group-based silane coupling agents, methacrylic group-based silane coupling agents, styryl group-based silane coupling agents, and amino group-based silane coupling agents.

The bonding layer may contain various additives. Examples of the additives include the additives that can be added to the elastic layer.

The thickness of the bonding layer is preferably from 3 μm to 300 μm inclusive, more preferably from 5 μm to 100 μm inclusive, and particularly preferably from 10 μm to 30 μm inclusive.

The thickness, e.g., the total thickness, of the fixing belt member according to the present exemplary embodiment is preferably from 0.05 mm to 0.5 mm inclusive, more preferably from 0.06 mm to 0.30 mm inclusive, and still more preferably from 0.07 mm to 0.15 mm inclusive.

(Method for Producing Fixing Belt Member)

No particular limitation is imposed on the method for producing the fixing belt member according to the present exemplary embodiment, and a known method may be used to form the fixing belt member.

In some cases, the fixing belt member according to the present exemplary embodiment is subjected to, for example, punching or ribbing. A fixing belt member including the base layer and further including additional layers such as the surface layer, the bonding layer, and a metal layer may be formed by forming the additional layers by known methods.

(Applications of Fixing Belt Member)

For example, the fixing belt member according to the present exemplary embodiment is applicable to both a heating belt and a pressurizing belt. The heating belt may be a heating belt that uses electromagnetic induction for heating or may be a heating belt for which an external heat source for heating is used.

When the fixing belt member according to the present exemplary embodiment is applied to a heating belt that uses electromagnetic induction for heating, a metal layer (heat generating layer) that generates heat by electromagnetic induction may be provided.

<Fixing Device>

A fixing device according to an exemplary embodiment includes the fixing belt member according to the preceding exemplary embodiment.

The fixing device according to the present exemplary embodiment can have various structures. For example, the fixing device may include a first rotatable member and a second rotatable member disposed in contact with the outer surface of the first rotatable member. The fixing belt member according to the preceding exemplary embodiment is applied to at least one of the first rotatable member and the second rotatable member.

A description will be given of fixing devices in first and second exemplary embodiments each including a heating belt and a pressurizing roller. In the first and second exemplary embodiments, the fixing belt member according to the preceding exemplary embodiment is applicable to both the heating belt and the pressurizing roller.

The fixing device according to the present exemplary embodiment is not limited to the fixing devices in the first and second exemplary embodiments and may be a fixing device including a pressurizing belt and one of a heating roller and a heating belt. The fixing belt member according to the preceding exemplary embodiment is applicable to any of the heating roller, the heating belt, and the pressurizing belt.

The fixing device according to the present exemplary embodiment is not limited to the fixing devices in the first and second exemplary embodiments and is applicable to a fixing device of the electromagnetic induction heating type described later in a third exemplary embodiment.

First Exemplary Embodiment of Fixing Device

Figure 3:
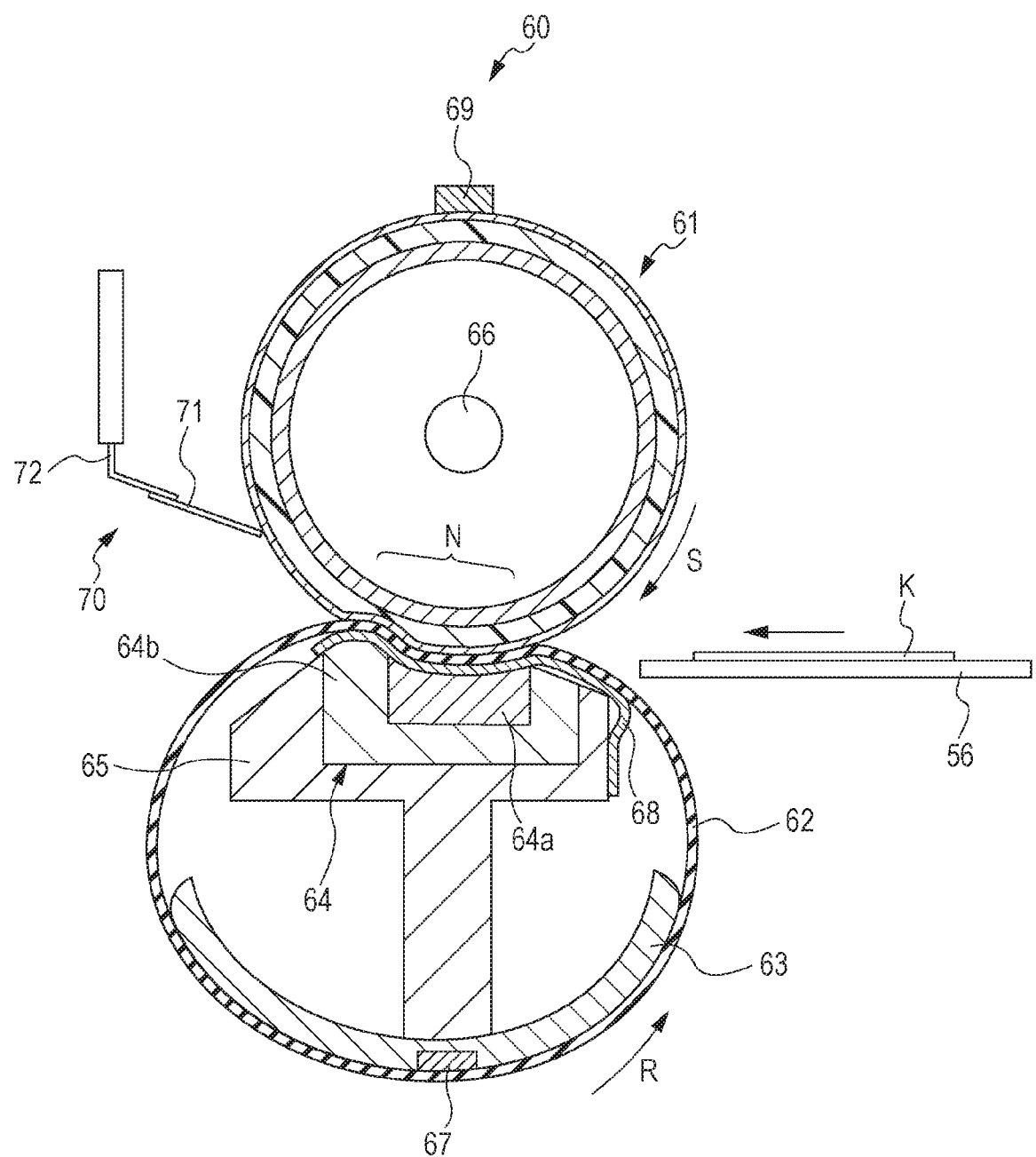
FIG. 3 is a schematic illustration showing a fixing device according to an exemplary embodiment.

The fixing device according to the first exemplary embodiment will be described. FIG. 3 is a schematic illustration showing an example of the fixing device according to the first exemplary embodiment.

As shown in FIG. 3, the fixing device 60 according to the first exemplary embodiment includes, for example, a heating roller 61 (an example of the first rotatable member) for rotation driving, a pressurizing belt 62 (an example of the second rotatable member), and a pressing pad 64 (an example of a pressing member) that presses the heating roller 61 through the pressurizing belt 62.

It is only necessary that the pressing pad 64 be disposed, for example, such that the pressurizing belt 62 and the heating roller 61 are pressed against each other. Therefore, the pressurizing belt 62 may be pressed against the heating roller 61, or the heating roller 61 may be pressed against the pressurizing belt 62.

A halogen lamp 66 (an example of the heating means) is disposed inside the heating roller 61. The heating means is not limited to the halogen lamp, and any other heat-generating member that generates heat may be used.

For example, a temperature sensing element 69 is disposed in contact with a surface of the heating roller 61. The halogen lamp 66 is turned on or off based on the temperature value measured by the temperature sensing element 69, and the surface temperature of the heating roller 61 is thereby maintained at a target temperature (e.g., 150° C.)

The pressurizing belt 62 is rotatably supported, for example, by the pressing pad 64 and a belt-running guide 63 that are disposed on the inner side of the pressurizing belt 62. The pressurizing belt 62 is disposed so as to be pressed against the heating roller 61 by the pressing pad 64 at a nip part N.

For example, the pressing pad 64 is disposed so as to be pressed against the heating roller 61 through the pressurizing belt 62 on the inner side of the pressurizing belt 62, and the nip part N is formed between the pressing pad 64 and the heating roller 61.

The pressing pad 64 includes, for example: a front nipping member 64a disposed on the entrance side of the nip part N to provide the wide nip part N; and a release nipping member 64b disposed on the exit side of the nip part N to distort the heating roller 61.

To reduce the sliding resistance between the inner circumferential surface of the pressurizing belt 62 and the pressing pad 64, a sheet-shaped sliding member 68, for example, is disposed on surfaces of the front nipping member 64a and the release nipping member 64b that are in contact with the pressurizing belt 62. The pressing pad 64 and the sliding member 68 are held by a metallic holding member 65.

For example, the sliding member 68 is disposed such that its sliding surface is in contact with the inner circumferential surface of the pressurizing belt 62 and participates in supply and maintenance of oil between the sliding member 68 and the pressurizing belt 62.

For example, the belt-running guide 63 is attached to the holding member 65 to allow the pressurizing belt 62 to rotate.

The heating roller 61 is rotated in the direction of an arrow S by, for example, an unillustrated driving motor, and the pressurizing belt 62 is driven by the rotation of the heating roller 61 and rotates in the direction of an arrow R that is opposite to the rotation direction of the heating roller 61. Specifically, for example, the heating roller 61 rotates in the clockwise direction in FIG. 3, and the pressurizing belt 62 rotates in the counterclockwise direction.

A paper sheet K (an example of the recording medium) with an unfixed toner image thereon is guided by, for example, a fixation entrance guide 56 and transported to the nip part N. When the paper sheet K passes through the nip part N, the toner image on the paper sheet K is fixed by pressure and heat applied to the nip part N.

In the fixing device 60 according to the first exemplary embodiment, for example, the front nipping member 64a having a concave shape conforming to the outer circumferential surface of the heating roller 61 allows the nip part N to have a larger area than that without the front nipping member 64a.

In the fixing device 60 according to the first exemplary embodiment, for example, the release nipping member 64b is disposed so as to protrude toward the outer circumferential surface of the heating roller 61, so that the distortion of the heating roller 61 increases locally in an exit region of the nip part N.

When the release nipping member 64b is disposed as described above, the paper sheet K subjected to fixation passes through the portion with large local distortion during passage through a release nipping region, and therefore the paper sheet K is easily released from the heating roller 61.

For example, a release member 70 used as auxiliary release means is disposed downstream of the nip part N of the heating roller 61. The release member 70 is held, for example, by a holding member 72 such that a release claw 71 extending in a direction (counter direction) opposite to the rotation direction of the heating roller 61 is disposed close to the heating roller 61.

Second Exemplary Embodiment of Fixing Device

Figure 4:
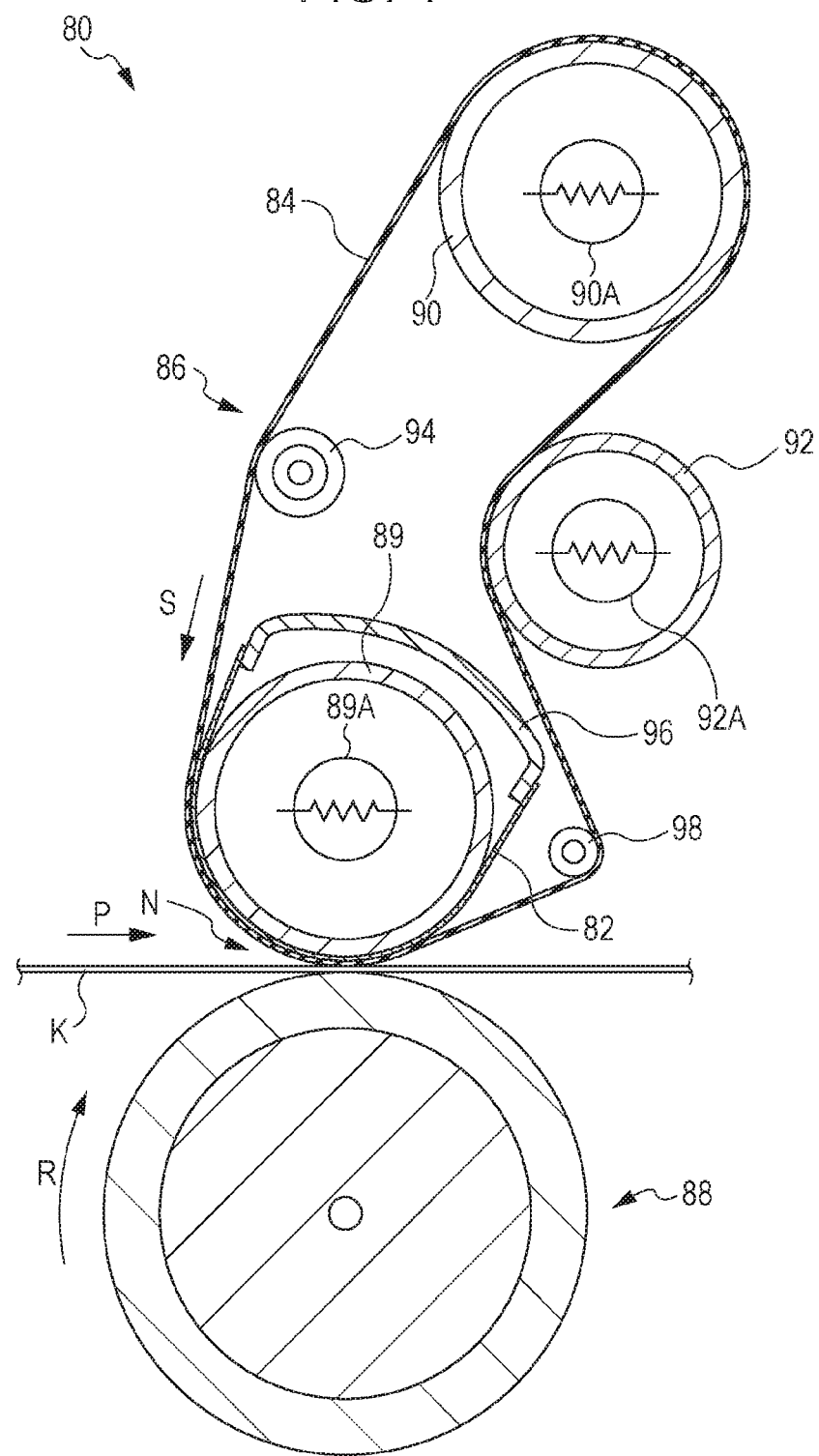
FIG. 4 is a schematic illustration showing a fixing device according to another exemplary embodiment.

The fixing device according to the second exemplary embodiment will be described. FIG. 4 is a schematic illustration showing an example of the fixing device according to the second exemplary embodiment.

As shown in FIG. 4, the fixing device 80 according to the second exemplary embodiment includes, for example: a fixing belt module 86 including a heating belt 84 (an example of the first rotatable member); and a pressurizing roller 88 (an example of the second rotatable member) pressed against the heating belt 84 (the fixing belt module 86). For example, a nip part N is formed in which the heating belt 84 (the fixing belt module 86) and the pressurizing roller 88 are in contact with each other. In the nip part N, a paper sheet K (an example of the recording medium) is pressurized and heated, and a toner image is thereby fixed.

The fixing belt module 86 includes, for example: the endless heating belt 84; a heat-pressing roller 89 which is disposed on the side toward the pressurizing roller 88, around which the heating belt 84 is wound, and which is driven to rotate by the rotating force of a motor (not shown) and presses the inner circumferential surface of the heating belt 84 toward the pressurizing roller 88; and a support roller 90 that supports the heating belt 84 from its inner side at a position different from the heat-pressing roller 89.

The fixing belt module 86 further includes, for example: a support roller 92 that is disposed on the outer side of the heating belt 84 and determines a circulating path of the heating belt 84; a trajectory correction roller 94 that corrects the trajectory of the heating belt 84 in a region between the heat-pressing roller 89 and the support roller 90; and a support roller 98 that applies tension to the heating belt 84 from its inner circumferential side at a position downstream of the nip part N in which the heating belt 84 (the fixing belt module 86) and the pressurizing roller 88 are in contact with each other.

For example, the fixing belt module 86 is disposed such that a sheet-shaped sliding member 82 is disposed between the heating belt 84 and the heat-pressing roller 89.

For example, the sliding member 82 is disposed such that its sliding surface is in contact with the inner circumferential surface of the heating belt 84 and participates in supply and maintenance of oil between the sliding member 82 and the heating belt 84.

For example, the sliding member 82 is disposed such that its opposite ends are supported by a support member 96.

For example, a halogen heater 89A (an example of the heating means) is disposed inside the heat-pressing roller 89.

The support roller 90 is, for example, a cylindrical roller made of aluminum, and a halogen heater 90A (an example of the heating means) is disposed thereinside to heat the heating belt 84 from its inner circumferential side.

For example, spring members (not shown) that press the heating belt 84 outward are disposed at opposite ends of the support roller 90.

The support roller 92 is, for example, a cylindrical roller made of aluminum, and a release layer made of a fluorocarbon resin and having a thickness of 20 μm is formed on a surface of the support roller 92.

For example, the release layer on the support roller 92 is formed in order to prevent toner and paper powder on the outer circumferential surface of the heating belt 84 from being deposited on the support roller 92.

For example, a halogen heater 92A (an example of the heating means) is disposed inside the support roller 92 and heats the heating belt 84 from its outer circumferential side.

Specifically, for example, the heating belt 84 is heated by the heat-pressing roller 89, the support roller 90, and the support roller 92.

The trajectory correction roller 94 is, for example, a cylindrical roller made of aluminum, and an edge position measuring mechanism (not shown) that measures an edge position of the heating belt 84 is disposed near the trajectory correction roller 94.

For example, the trajectory correction roller 94 includes disposed therein an axial position changing mechanism (not shown) that changes the axial contact position of the heating belt 84 according to the results of measurement by the edge position measuring mechanism, and meandering of the heating belt 84 is thereby controlled.

For example, the pressurizing roller 88 is rotatably supported and is pressed by urging means such as an unillustrated spring against a portion of the heating belt 84 that is wound around the heat-pressing roller 89. Therefore, as the heating belt 84 (the heat-pressing roller 89) of the fixing belt module 86 rotates and moves in the direction of an arrow S, the pressurizing roller 88 driven by the heating belt 84 (the heat-pressing roller 89) rotates and moves in the direction of an arrow R.

A paper sheet K with an unfixed toner image (not shown) placed thereon is transferred in the direction of an arrow P. When the unfixed toner image is guided to the nip part N of the fixing device 80, the toner image is fixed by pressure and heat applied to the nip part N.

In the description of the fixing device 80 according to the second exemplary embodiment, the halogen heaters (halogen lamps) are used as examples of the heating means, but this is not a limitation. Heating elements other than the halogen heaters may be used. Examples of such heating elements include radiation lamp heating elements (heating elements that emit radiation such as infrared radiation) and resistance heating elements (heating elements in which an electric current is applied to a resistor to generate Joule heat: e.g., a heating element prepared by forming a film with resistance on a ceramic substrate and then firing the resulting substrate).

Third Exemplary Embodiment of Fixing Device

Figure 5:
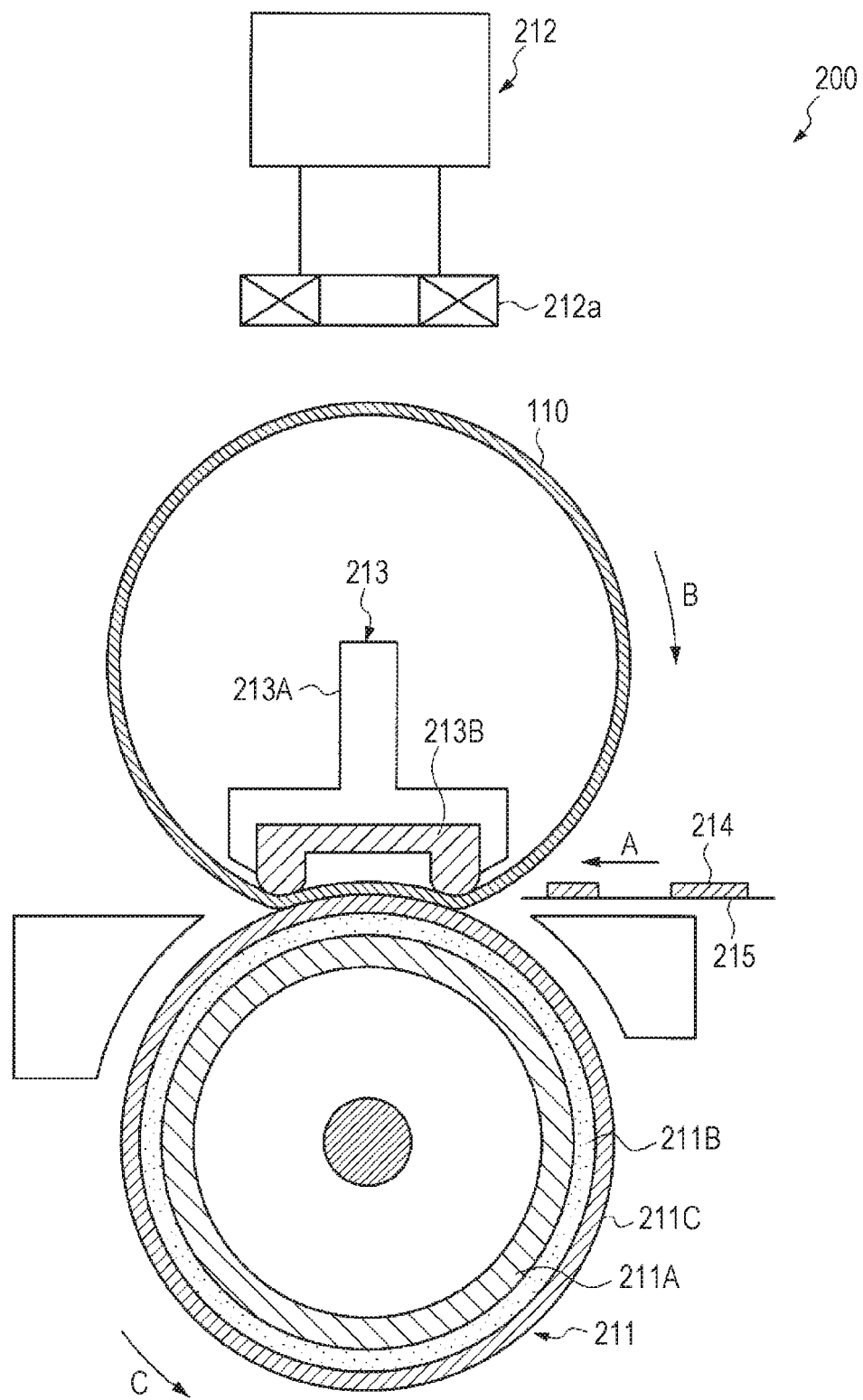
FIG. 5 is a schematic illustration showing a fixing device according to still another exemplary embodiment.

The fixing device according to the third exemplary embodiment will be described. FIG. 5 is a schematic illustration showing an example of the fixing device according to the third exemplary embodiment.

The fixing device 200 according to the third exemplary embodiment is an electromagnetic induction type fixing device including a fixing member 110 having a metallic layer. In the fixing device 200 according to the third exemplary embodiment, the fixing belt member according to the preceding exemplary embodiment is used as the fixing member 110.

As shown in FIG. 5, a pressurizing roller (pressurizing member) 211 is disposed so as to press part of the belt (fixing member) 110. From the viewpoint of efficient fixation, a contact region (nip) is formed between the fixing member 110 and the pressurizing roller 211, and the belt 110 is curved so as to conform to the circumferential surface of the pressurizing roller 211. From the viewpoint of obtaining recording medium releasability, a curved portion is formed at a downstream end of the contact region (nip) such that the belt is curved.

The pressurizing roller 211 includes a base 211A, an elastic layer 211B made of, for example, silicone rubber and formed on the base 211A, and a release layer 211C made of a fluorine-based compound and formed on the elastic layer 211B.

A counter member 213 is disposed on the inner side of the belt 110 at a position facing the pressurizing roller 211. The counter member 213 is made of, for example, a metal, a heat-resistant resin, or heat-resistant rubber and includes: a pad 213B that is in contact with the inner circumferential surface of the belt 110 to increase pressure locally; and a support 13A that supports the pad 213B.

An electromagnetic induction heating device 212 including an electromagnetic induction coil (exciting coil) 212a installed therein is disposed at a position facing the pressurizing roller 211 (an example of the heating member) with the belt 110 at the center. In the electromagnetic induction heating device 212, an AC current is applied to the electromagnetic induction coil, and the generated magnetic field is changed by an exciting circuit. An eddy current is thereby generated in the unillustrated metal layer (e.g., an electromagnetic induction metal layer) of the belt 110. The eddy current is converted to heat (Joule heat) by the electric resistance of the unillustrated metal layer, and heat is thereby generated on the surface of the belt 110.

The position of the electromagnetic induction heating device 212 is not limited to the position shown in FIG. 5. For example, the electromagnetic induction heating device 212 may be disposed on the upstream side, with respect to a rotation direction B, of the contact region of the belt 110 or may be disposed on the inner side of the belt 110.

In the fixing device 200 according to the third exemplary embodiment, a driving force is transmitted from a driving device to a gear fixed to an edge portion of the belt 110, and the belt 110 thereby rotates in the direction of an arrow B. As the belt 110 rotates, the pressurizing roller 211 rotates in the opposite direction, i.e., the direction of an arrow C.

A recording medium 215 with an unfixed toner image 214 formed thereon moves in the direction of an arrow A and passes through the contact region (nip) between the belt 110 and the pressurizing roller 211 in the fixing device 200. Pressure is applied to the unfixed toner image in a fused state, and the toner image is thereby fixed onto the recording medium 215.

[Image Forming Apparatus]

Next, an image forming apparatus according to an exemplary embodiment will be described.

The image forming apparatus in the present exemplary embodiment includes: image holding members; charging means for charging the surfaces of the respective image holding members; latent image forming means for forming latent images on the charged surfaces of the respective image holding members; developing means for developing the latent images with toner to form toner images; transferring means for transferring the toner images onto a recording medium; and fixing means for fixing the toner images onto the recording medium. The fixing device according to the preceding exemplary embodiment is used as the fixing means.

The image forming apparatus according to the present exemplary embodiment will be described with reference to FIG. 6.

Figure 6:
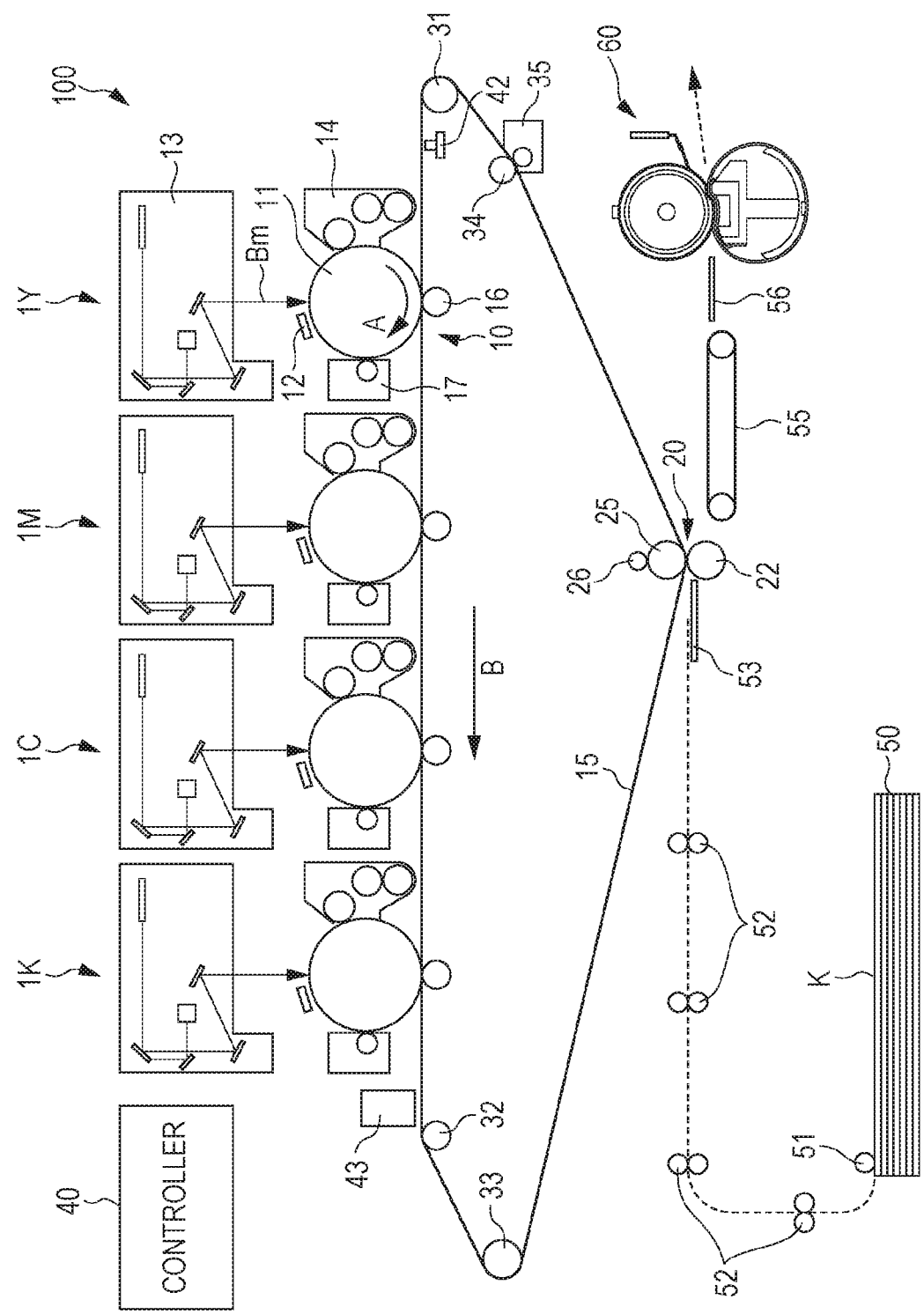
FIG. 6 is a schematic illustration showing an example of an image forming apparatus according to an exemplary embodiment.

FIG. 6 is a schematic illustration showing the structure of the image forming apparatus according to the present exemplary embodiment.

As shown in FIG. 6, the image forming apparatus 100 according to the present exemplary embodiment is, for example, an intermediate transfer type image forming apparatus having a so-called tandem configuration and includes: a plurality of image forming units 1Y, 1M, 1C, and 1K that form toner images of respective colors by an electrophotographic process; first transfer units 10 that transfer (first-transfer) the color toner images formed by the image forming units 1Y, 1M, 1C, and 1K sequentially onto an intermediate transfer belt 15; a second transfer unit 20 that transfers (second-transfers) all the superposed toner images transferred onto the intermediate transfer belt 15 at once onto a paper sheet K used as a recording medium; and a fixing device 60 that fixes the second-transferred images onto the paper sheet K. The image forming apparatus 100 further includes a controller 40 that controls the operation of each device (each unit).

The fixing device 60 is the above-described fixing device 60 according to the first exemplary embodiment. The image forming apparatus 100 may include the above-described fixing device 80 according to the second exemplary embodiment or may include the above-described fixing device 200 according to the third exemplary embodiment.

Each of the image forming units 1Y, 1M, 1C, and 1K of the image forming apparatus 100 includes a photoreceptor 11 that rotates in the direction of an arrow A and serves as an example of the image holding members each of which holds a toner image formed on its surface.

A charging unit 12 that charges the photoreceptor 11 and serves as an example of the charging means is disposed near the circumference of the photoreceptor 11. A laser exposure unit 13 serving as an example of the latent image forming means and used to write an electrostatic latent image on the photoreceptor 11 is disposed above the photoreceptor 11 (in FIG. 6, an exposure beam is denoted by symbol Bm).

A developer 14 that serves as an example of the developing means, contains color toner, and visualizes the electrostatic latent image on the photoreceptor 11 with the toner is disposed near the circumference of the photoreceptor 11, and a first transfer roller 16 is provided which transfers the color toner image formed on the photoreceptor 11 onto the intermediate transfer belt 15 in a corresponding first transfer unit 10.

A photoreceptor cleaner 17 that removes the toner remaining on the photoreceptor 11 is disposed near the circumference of the photoreceptor 11, and the electrophotographic devices including the charging unit 12, the laser exposure unit 13, the developer 14, the first transfer roller 16, and the photoreceptor cleaner 17 are sequentially arranged in the rotation direction of the photoreceptor 11. The image forming units 1Y, 1M, 1C, and 1K are arrange substantially linearly in the order of yellow (Y), magenta (M), cyan (C), and black (K) from the upstream side of the intermediate transfer belt 15.

The intermediate transfer belt 15 serving as an intermediate transfer body is formed from a film-shaped pressurizing belt that includes a base layer made of a resin such as polyimide or polyamide and contains an appropriate amount of an antistatic agent such as carbon black. The intermediate transfer belt 15 is formed so as to have a volume resistivity of from $10^6$ Ω·cm to $10^{14}$ Ω·cm inclusive, and its thickness is, for example, about 0.1 mm.

The intermediate transfer belt 15 is circulated (rotated) by various rollers in a direction B shown in FIG. 6 at a speed appropriate for its intended use. These rollers include: a driving roller 31 driven by a motor (not shown) excellent in constant speed property to rotate the intermediate transfer belt 15; a support roller 32 that supports the intermediate transfer belt 15 extending substantially linearly in the arrangement direction of the photoreceptors 11; a tension applying roller 33 that applies tension to the intermediate transfer belt 15 and serves as a correction roller for preventing meandering of the intermediate transfer belt 15; a back roller 25 disposed in the second transfer unit 20; and a cleaning back roller 34 disposed in a cleaning unit in which toner remaining on the intermediate transfer belt 15 is scraped off.

Each first transfer unit 10 includes a corresponding first transfer roller 16 facing a corresponding photoreceptor 11 with the intermediate transfer belt 15 therebetween. The first transfer roller 16 includes a core and a sponge layer serving as an elastic layer adhering to the circumference of the core. The core is a cylindrical rod made of a metal such as iron or SUS. The sponge layer is formed of a rubber blend of NBR, SBR, and EPDM with a conducting agent such as carbon black added thereto and is a sponge-like cylindrical roller having a volume resistivity of from $10^{7.5}$ Ω·cm to $10^{8.5}$ Ω·cm inclusive.

The first transfer roller 16 is disposed so as to be pressed against the photoreceptor 11 with the intermediate transfer belt 15 therebetween, and a voltage (first transfer bias) with polarity opposite to the charge polarity of toner (negative polarity, the same applies to the following) is applied to the first transfer roller 16. Therefore, the toner images on the photoreceptors 11 are electrostatically attracted to the intermediate transfer belt 15 in a sequential manner, and the toner images are superposed on the intermediate transfer belt 15.

The second transfer unit 20 includes the back roller 25 and a second transfer roller 22 disposed on the toner image holding surface side of the intermediate transfer belt 15.

The surface of the back roller 25 is formed from a tube made of a rubber blend of EPDM and NBR with carbon dispersed therein, and the inner portion of the back roller 25 is made of EPDM rubber. The back roller 25 is formed such that its surface resistivity is from $10^7$ Ω/square to $10^{10}$ Ω/square inclusive, and its hardness is set to, for example, 70° (the ASKER C manufactured by Kobunshi Keiki Co., Ltd., the same applies to the following). The back roller 25 is disposed on the back side of the intermediate transfer belt 15 and forms a counter electrode of the second transfer roller 22, and a metallic feeding roller 26 to which a second transfer bias is stably applied is disposed in contact with the back roller 25.

The second transfer roller 22 includes a core and a sponge layer serving as an elastic layer adhering to the circumference of the core. The core is a cylindrical rod made of a metal such as iron or SUS. The sponge layer is formed of a rubber blend of NBR, SBR, and EPDM with a conducting agent such as carbon black added thereto and is a sponge-like cylindrical roller having a volume resistivity of from $10^{7.5}$ Ω·cm to $10^{8.5}$ Ω·cm inclusive.

The second transfer roller 22 is disposed so as to be pressed against the back roller 25 with the intermediate transfer belt 15 therebetween. The second transfer roller 22 is grounded, and the second transfer bias is formed between the second transfer roller 22 and the back roller 25, and the toner images are second-transferred onto a paper sheet K transferred to the second transfer unit 20.

An intermediate transfer belt cleaner 35 is disposed downstream of the second transfer unit 20 so as to be separable from the intermediate transfer belt 15. The intermediate transfer belt cleaner 35 removes toner and paper powder remaining on the intermediate transfer belt 15 after the second transfer to thereby clean the surface of the intermediate transfer belt 15.

The intermediate transfer belt 15, the first transfer units 10 (the first transfer rollers 16), and the second transfer unit 20 (the second transfer roller 22) correspond to examples of the transferring means.

A reference sensor (home position sensor) 42 that generates a reference signal used as a reference for image formation timings in the image forming units 1Y, 1M, 1C, and 1K is disposed upstream of the yellow image forming unit 1Y. An image density sensor 43 for image quality adjustment is disposed downstream of the black image forming unit 1K. When the reference sensor 42 detects a mark provided on the back side of the intermediate transfer belt 15, the reference sensor 42 generates the reference signal. The controller 40 issues instructions based on the reference signal to start image formation in the image forming units 1Y, 1M, 1C, and 1K.

The image forming apparatus according to the present exemplary embodiment further includes, as transfer means for transferring a paper sheet K: a paper sheet container 50 that contains paper sheets K; a paper feed roller 51 that picks up and transfers the paper sheets K stacked in the paper sheet container 50 one by one at predetermined timing; transfer rollers 52 that transfer each paper sheet K fed by the paper feed roller 51; a transfer guide 53 that feeds the paper sheet K transferred by the transfer rollers 52 to the second transfer unit 20; a transfer belt 55 that transfers, to the fixing device 60, the paper sheet K transferred by the second transfer roller 22 after second transfer; and a fixation entrance guide 56 that guides the paper sheet K to the fixing device 60.

Next, a basic image forming process of the image forming apparatus according to the present exemplary embodiment will be described.

In the image forming apparatus according to the present exemplary embodiment, image data outputted from, for example, an unillustrated image reading device or an unillustrated personal computer (PC) is subjected to image processing in an unillustrated image processing device, and image forming operations are performed in the image forming units 1Y, 1M, 1C, and 1K.

In the image processing device, the inputted reflectance data is subjected to various types of image processing such as shading compensation, misregistration correction, lightness/color space transformation, gamma correction, frame erasure, and various types of image editing such as color editing and move editing. The image data subjected to the image processing is converted to four types of color tone data including Y color data, M color data, C color data, and K color data, and they are outputted to the respective laser exposure units 13.

In each of the laser exposure units 13, the photoreceptor 11 of a corresponding one of the image forming units 1Y, 1M, 1C, and 1K is irradiated with an exposure beam Bm emitted from, for example, a semiconductor laser according to the inputted color tone data. In each of the image forming units 1Y, 1M, 1C, and 1K, the surface of the photoreceptor 11 is charged by the charging unit 12 and is then scanned and exposed using the laser exposure unit 13, and an electrostatic latent image is thereby formed. The formed electrostatic latent images are developed in the respective image forming units 1Y, 1M, 1C, and 1K to thereby form Y, M, C, and K color images.

The toner images formed on the photoreceptors 11 of the image forming units 1Y, 1M, 1C, and 1K are transferred onto the intermediate transfer belt 15 in the first transfer units 10 in which the photoreceptors 11 come into contact with the intermediate transfer belt 15. More specifically, in each of the first transfer units 10, a voltage (first transfer bias) with polarity opposite to the charge polarity (negative polarity) of the toner is applied by the first transfer roller 16 to the base of the intermediate transfer belt 15. The toner images are thereby sequentially superposed onto the surface of the intermediate transfer belt 15, and the first transfer is completed.

After the toner images have been sequentially first-transferred onto the surface of the intermediate transfer belt 15, the intermediate transfer belt 15 moves, and the toner images are transferred toward the second transfer unit 20. When the toner images are conveyed toward the second transfer unit 20, the paper feed roller 51 in the transfer means starts rotating at the timing of conveyance of the toner images toward the second transfer unit 20 to feed a paper sheet K of the intended size from the paper sheet container 50. The paper sheet K fed by the paper feed roller 51 is conveyed by the transfer rollers 52 and reaches the second transfer unit 20 through the transfer guide 53. Before the paper sheet K reaches the second transfer unit 20, the paper sheet K is temporarily stopped. Then a registration roller (not shown) starts rotating at an appropriate timing determined by the movement of the intermediate transfer belt 15 with the toner images held thereon, and the position of the paper sheet K is thereby aligned with the position of the toner images.

In the second transfer unit 20, the second transfer roller 22 is pressed against the back roller 25 through the intermediate transfer belt 15. In this case, the paper sheet K transferred at the appropriate timing is pinched between the intermediate transfer belt 15 and the second transfer roller 22. Then, when a voltage (second transfer bias) with the same polarity as the charge polarity (negative polarity) of the toner is applied from the feeding roller 26, a transfer electric field is formed between the second transfer roller 22 and the back roller 25. All the unfixed toner images held on the intermediate transfer belt 15 are thereby electrostatically transferred at once onto the paper sheet K in the second transfer unit 20 in which the intermediate transfer belt 15 is pressed by the second transfer roller 22 and the back roller 25.

Then the paper sheet K with the toner images electrostatically transferred thereon is released from the intermediate transfer belt 15 and transferred by the second transfer roller 22 to the transfer belt 55 disposed downstream, with respect to the transfer direction of the paper sheet, of the second transfer roller 22. The transfer belt 55 transfers the paper sheet K to the fixing device 60 at an optimal transfer speed for the fixing device 60. The unfixed toner images on the paper sheet K transferred to the fixing device 60 are subjected to fixing processing using heat and pressure by the fixing device 60 and thereby fixed onto the paper sheet K. The paper sheet K with the fixed image formed thereon is transferred to an output sheet container (not shown) disposed in an output unit of the image forming apparatus.

After completion of transfer onto the paper sheet K, the toner remaining on the intermediate transfer belt 15 is transferred to the cleaning unit by the rotation of the intermediate transfer belt 15 and is removed from the intermediate transfer belt 15 by the cleaning back roller 34 and the intermediate transfer belt cleaner 35.

Although the exemplary embodiments have been described, the exemplary embodiments are not to be construed as being limited to the exemplary modes described above. It will be appreciated that various modifications, changes, and improvements are possible and can be embodied so long as the requirements of the present exemplary embodiments are satisfied.

EXAMPLES

Examples of the present disclosure will be described, but the present disclosure is not limited to the following Examples. In the following description, "parts" and "%" are based on mass, unless otherwise specified.

Example 1

1 kg of a 20% by mass (18% by mass after imidization) n-methyl-2-pyrrolidinone (NMP) solution of polyamic acid (molecular weight: 65,000) formed from 3,3',4,4'-biphenyltetracarboxylic acid dianhydride and 4,4'-diaminodiphenyl ether is prepared.

108 g of acetylene black (DENKA BLACK manufactured by Denka Company Limited, granular form, primary particle diameter: 35 nm) is added to 1 kg of the prepared solution and then dispersed using a wet jet mill (Genus PY manufactured by Genus, the mixture is caused to pass through an orifice of ϕ0.1 mm five times at a pressure of 200 MPa).

Next, the resulting solution is injected from a nozzle of ϕ3 mm onto the surface of an aluminum-made pipe rotated at 30 rpm, and, at the same time, a stainless steel (SUS)-made blade of t=0.15 mm is pressed against the pipe to perform smoothing treatment and moved horizontally at 100 mm/min. A uniform amide-imide resin film is thereby formed on the surface of the aluminum-made pipe. The amide-imide resin film is dried at 120° C. for 20 minutes while the aluminum-made pipe is rotated at 10 rpm, subjected to imidization at 330° C. for 30 minutes, and returned to room temperature. Then the coating is pulled out and cut, and a cylindrical base (fixing belt member) of ϕ30 mm, a width of 330 mm, and a thickness of about 80 μm is thereby obtained.

Example 2

The same procedure as in Example 1 is repeated except that the amount of the acetylene black added is changed to 45 g to thereby obtain a cylindrical member of ϕ30 mm, a width of 330 mm, and a thickness of about 80 μm.

Example 3

The same procedure as in Example 1 is repeated except that the acetylene black is changed to graphitized carbon black (TOKABLACK #3800 manufactured by Tokai Carbon Co., Ltd., primary particle diameter: 70 nm) to thereby obtain a cylindrical member of ϕ30 mm, a width of 330 mm, and a thickness of about 80 μm.

Example 4

The same procedure as in Example 1 is repeated except that the 4,4'-diaminodiphenyl ether is changed to p-phenylenediamine and the imidization is performed at 380° C. to thereby obtain a cylindrical member of ϕ30 mm, a width of 330 mm, and a thickness of about 80 μm.

Example 5

The same procedure as in Example 1 is repeated except that 43.2 g of acetylene black (DENKA BLACK manufactured by Denka Company Limited, granular form, primary particle diameter: 35 nm) and 54 g of graphite (BF-3AK manufactured by Chuetsu Graphite Works Co., Ltd., particle diameter: 3 μm) are added instead of 108 g of acetylene black to thereby obtain a cylindrical member of ϕ30 mm, a width of 330 mm, and a thickness of about 80 μm.

Example 6

The same procedure as in Example 1 is repeated except that the amount of acetylene black added is changed to 27 g to thereby obtain a cylindrical member of ϕ30 mm, a width of 330 mm, and a thickness of about 80 μm.

Comparative Example 1

The same procedure as in Example 1 is repeated except that the acetylene black is changed to oxidized carbon black (Printex V manufactured by Orion Engineered Carbons, primary particle diameter: 70 nm) to thereby obtain a cylindrical member of ϕ30 mm, a width of 330 mm, and a thickness of about 80 μm.

Comparative Example 2

The same procedure as in Example 1 is repeated except that the acetylene black is changed to graphite (BF-3AK manufactured by Chuetsu Graphite Works Co., Ltd., particle diameter: 3 μm) to thereby obtain a cylindrical member of ϕ30 mm, a width of 330 mm, and a thickness of about 80 μm.

Comparative Example 3

The same procedure as in Example 1 is repeated except that the acetylene black is changed to conductive carbon black (Vulcan XC-72 manufactured by Cabot Corporation, primary particle diameter: 30 nm) to thereby obtain a cylindrical member of ϕ30 mm, a width of 330 mm, and a thickness of about 80 μm.

The graphitization degrees (G/D ratios) of the acetylene black used (DENKA BLACK manufactured by Denka Company Limited, granular form, primary particle diameter: 35 nm), the graphitized carbon black (TOKABLACK #3800 manufactured by Tokai Carbon Co., Ltd., primary particle diameter: 70 nm), the oxidized carbon black (Printex V manufactured by Orion Engineered Carbons, primary particle diameter: 70 nm), and the conductive carbon black (Vulcan XC-72 manufactured by Cabot Corporation) are as follows, the graphitization degrees being measured by a laser Raman spectrophotometer (NRS-3100 manufactured by JASCO Corporation).

DENKA BLACK: 1.1
TOKABLACK #3800: 2.5
Printex V: 0.6
Vulcan XC-72: 0.8

[Evaluation]
Frictional Force (Frictional Resistance of Inner Surface)

The surface property tester type 14 (manufactured by Shinto Scientific Co., Ltd.) is used, and a cuboidal urethane rubber probe with a hardness of 60°, a thickness of 3 mm, and a width of 20 mm is placed on the mold-side surface of a sample of a fixing belt member such that the angle between the urethane rubber probe and the surface of the fixing belt member is 10°. With a vertical load of 200 g applied to the urethane rubber probe, the urethane rubber probe is pulled and moved a distance of 50 mm at a speed of 10 mm/s, and the average load during the movement is measured. The load is measured three times, and the average of the measurements is used as the frictional force of the sample.

The criteria of evaluation are as follows.
A: 150 gf or less
B: 150 gf or more and less than 200 gf
C: 200 gf or more —Thermal Conductivity—

The thermal conductivity of the cylindrical member obtained in each of the Examples is measured three times using the ai-Phase Mobile (manufactured by ai-Phase Co., Ltd.), and the average of the measurements is used as the thermal conductivity.

Specifically, a sample cut from the fixing belt member is placed on a probe, and a weight of 50 gf is placed thereon. The thermal conductivity is measured in a manual mode at 1.41 V for a measurement time of 2 seconds in 10 divisions in the range of 3 Hz to 100 Hz, —Folding Endurance—

A sample of 15 mm in width×150 mm in length cut from the fixing belt member obtained in each Example in its circumferential direction is used, and a folding endurance tester shown in JIS-P8115 is used. The radius of curvature of a bending portion and tension are changed to change bending stress applied to the sample. An S-N graph with the horizontal axis representing the fold number and the vertical axis representing the stress is produced, and the fold number when the bending stress is 100 MPa is determined for the purpose of comparison. The bending angle is 135° on one side, and the bending speed is 175 cycles/min. When the bending stress is 100 MPa, the fold number is preferably 2,500 or more and more preferably 10,000 or more.

The criteria of evaluation are as follows.
A: 10,000 or more
B: 2,500 or more and less than 10,000
C: less than 2,500

—Fixation Ratio and Durability—

A 350 µm film of X-34-1972-3 A/B (manufactured by Shin-Etsu Chemical Co., Ltd.) serving as an elastic layer is formed on the surface of each of the fixing belt members obtained in the Examples and Comparative Examples, and then the resulting fixing belt member is subjected to bonding treatment with 20 µm of KE-1950-10A/B. Then a tetrafluoroethylene-perfluoroalkoxyethylene copolymer (PFA) film having an inner surface subjected to bonding treatment is formed, and a cylindrical member is thereby produced (see FIG. 2).

Figure 2:
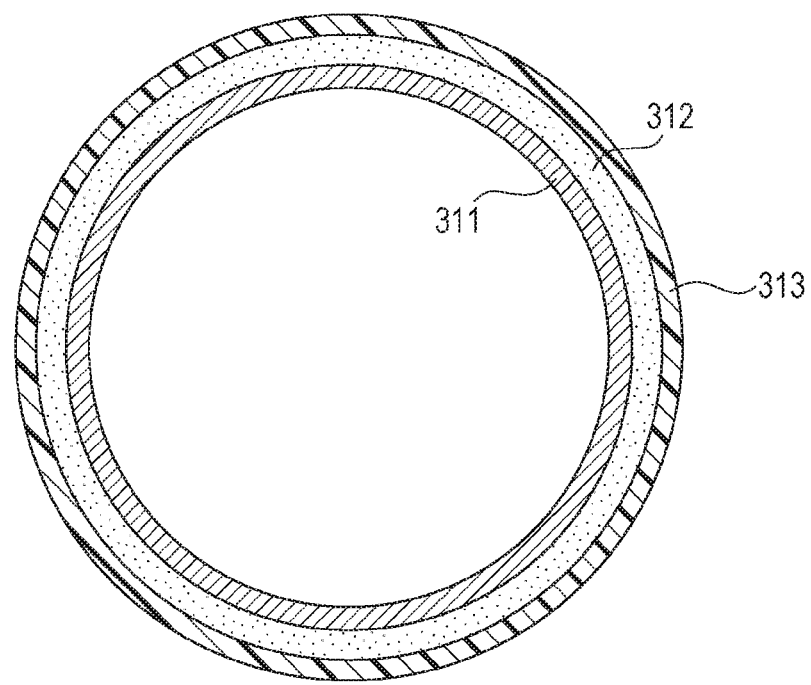
FIG. 2 is a cross-sectional view showing the layer structure of a cylindrical member that has formed therein a tetrafluoroethylene-perfluoroalkoxyethylene copolymer (PFA) film with its inner surface subjected to bonding treatment and is used to measure the fixation ratio and durability.

FIG. 2 is a cross-sectional view showing a fixing belt having a three-layer structure including a fixing belt member 311 and a fluorocarbon resin layer 313 formed on the outer circumferential surface of the fixing belt member 311 through a bonding layer 312.

—Fixation Ratio—

Each of the cylindrical members is used to fix unfixed toner using an apparatus shown in FIG. 1. Then a tape peeling test is performed to evaluate the fixation ratio.

FIG. 1 is a cross-sectional view schematically showing a fixing process using the fixing belt. As shown in FIG. 1, an unfixed toner image 305 on a transfer target 304 is heated by heating means (heater) 302 through the fixing belt member 301 and is pressed by a pressing roller 303 to fix the toner image, and a fixed toner image (fixed image) 306 is thereby formed.

Specifically, an adhesive tape (Scotch mending tape manufactured by 3M) is lightly applied to the fixed image, and a linear pressure of 250 g/cm is applied to the tape to cause the tape to adhere to the image surface. Then the tape is peeled off. The absorbance of the image is measured before and after the tape is peeled off using a spectrocolorimeter (CM-3700d manufactured by KONICA MINOLTA, INC.). Specifically the absorbance value is measured at a wavelength at which the absorbance of reflected light within the wavelength range of 400 nm to 800 nm is maximum, and the value of (the maximum absorbance after the tape is peeled off)/(the maximum absorbance before the tape is peeled off)×100 is used as the fixation ratio.

The criteria of evaluation are as follows.
A: 95% or more
B: 90% or more and less than 95%
C: less than 90%

—Durability—

The apparatus shown in FIG. 1 is used to evaluate durability. Specifically, paper sheets are continuously caused to pass through the apparatus.

The criteria of evaluation are as follows.
A: The base layer is not broken and follows the rotation of the pressurizing roller even when the number of sheets used is 400,000.
B: The base layer is broken or does not follow the rotation of the pressurizing roller when the number of sheets used is 250,000 or more and less than 400,000.
C: The base layer is broken or does not follow the rotation of the pressurizing roller when the number of sheets used is less than 250,000.

The evaluation results are summarized in Table 1.

TABLE 1

|  | Example 1 | Example 2 | Example 3 | Example 4 | Example 5 | Example 6 | Comparative Example 1 | Comparative Example 2 | Comparative Example 3 |
|---|---|---|---|---|---|---|---|---|---|
| Resin | Polyimide BPDA-ODA | Polyimide BPDA-ODA | Polyimide BPDA-ODA | Polyimide BPDA-PDA | Polyimide BPDA-ODA | Polyimide BPDA-ODA | Polyimide BPDA-ODA | Polyimide BPDA-ODA | Polyimide BPDA-ODA |
| Heat transfer agent | Acetylene black | Acetylene black | Graphitized carbon black | Acetylene black | Acetylene black Graphite | Acetylene black | Oxidized carbon black | Graphite | Conductive carbon black |

TABLE 1-continued

| | Example 1 | Example 2 | Example 3 | Example 4 | Example 5 | Example 6 | Comparative Example 1 | Comparative Example 2 | Comparative Example 3 |
|---|---|---|---|---|---|---|---|---|---|
| Thermal conductivity (W/m·K) | 0.63 | 0.44 | 0.57 | 0.72 | 0.66 | 0.33 | 0.32 | 0.41 | 0.35 |
| Frictional force | 115 gf | 127 gf | 121 gf | 110 gf | 172 gf | 174 gf | 242 gf | 231 gf | 235 gf |
| | A | A | A | A | B | B | C | C | C |
| Fixation ratio | 96 | 92 | 93 | 97 | 96 | 82 | 88 | 90 | 87 |
| | A | B | B | A | A | C | C | B | C |
| Folding endurance | 5,204 | 57,721 | 4,508 | 4,520 | 850 | 103,500 | 18 | 276 | 24 |
| | A | A | B | B | C | A | C | C | C |
| Durability | A | A | B | B | C | A | C | C | C |

As can be seen from the Examples and Comparative Examples, the fixing belt member according to the preceding exemplary embodiment has high thermal conductivity, and the frictional resistance of its inner surface is small.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A fixing belt member comprising:
   a base layer containing a polyimide-based resin composition,
   wherein the base layer has a thermal conductivity of 0.33 W/(m·K) or more, and
   wherein the base layer has an inner-side surface with a frictional force of 110 gf to 220 gf.

2. The fixing belt member according to claim 1, wherein the thermal conductivity of the base layer is 0.40 W/(m·K) or more.

3. The fixing belt member according to claim 1, wherein the frictional force of the inner-side surface of the base layer is from 110 gf to 200 gf inclusive.

4. The fixing belt member according to claim 1, wherein the frictional force of the inner-side surface of the base layer is from 110 gf to 180 gf inclusive.

5. The fixing belt member according to claim 1, wherein the base layer further contains at least one type of particles selected from the group consisting of acetylene black particles and graphitized carbon black particles.

6. The fixing belt member according to claim 5, wherein the particles has an average primary particle diameter of from 5 nm to 200 nm inclusive.

7. The fixing belt member according to claim 6, wherein the average primary particle diameter of the particles is from 25 nm to 100 nm inclusive.

8. The fixing belt member according to claim 5, wherein a ratio of a mass of the particles contained in the base layer to a mass of the polyimide-based resin composition contained in the base layer is 2:1 to 1:10.

9. A fixing belt member comprising:
   a base layer containing a polyimide-based resin composition and at least one type of particles selected from the group consisting of acetylene black particles and graphitized carbon black particles;
   wherein the particles have an average primary particle diameter of from 5 nm to 200 nm inclusive, and
   a ratio of a mass of the particles contained in the base layer to a mass of the polyimide-based resin composition contained in the base layer is 2:1 to 1:10.

10. The fixing belt member according to claim 1:
    wherein the base layer has a thermal conductivity of 0.57 W/(m·K) or more.

11. The fixing belt member according to claim 10, wherein the thermal conductivity of the base layer is from 0.57 W/(m·K) to 0.72 W/(m·K) inclusive.

12. The fixing belt member according to claim 1, wherein the base layer has an inner-side surface with a frictional force of 180 gf or less.

13. The fixing belt member according to claim 1, wherein the average primary particle diameter of the particles is from 25 nm to 100 nm inclusive.

14. The fixing belt member according to claim 13, wherein the ratio of the mass of the particles contained in the base layer to the mass of the polyimide-based resin composition contained in the base layer is 1:1 to 1:5.

15. The fixing belt member according to claim 1, wherein the ratio of the mass of the particles contained in the base layer to the mass of the polyimide-based resin composition contained in the base layer is 1:1 to 1:5.

16. A fixing device comprising the fixing belt member according to claim 1.

17. An image forming apparatus comprising the fixing belt member according to claim 1.

18. The fixing belt member according to claim 1, wherein a thermal conductivity of the base layer is 0.33 W/(m·K) or more.

19. The fixing belt member according to claim 1, wherein the base layer has an inner-side surface with a frictional force of 220 gf or less.

* * * * *